United States Patent [19]

Chapman

[11] Patent Number: 5,265,810
[45] Date of Patent: * Nov. 30, 1993

[54] WATER INLET FOR A LINEAR MOVE IRRIGATION SYSTEM

[75] Inventor: John A. Chapman, Waterloo, Nebr.

[73] Assignee: Valmont Industries, Inc., Omaha, Nebr.

[*] Notice: The portion of the term of this patent subsequent to Jan. 14, 2009 has been disclaimed.

[21] Appl. No.: 765,180

[22] Filed: Sep. 25, 1991

[51] Int. Cl.$^5$ ................................................ B05B 3/18
[52] U.S. Cl. ................................................ 239/724
[58] Field of Search .................. 137/615, 899.1; 239/724, 739, 740

[56] References Cited

U.S. PATENT DOCUMENTS

| | | | |
|---|---|---|---|
| 2,249,130 | 7/1941 | Gunther | 61/12 |
| 2,718,433 | 9/1955 | Poynor et al. | 299/52 |
| 3,008,422 | 11/1961 | Crisafulli | 239/724 X |
| 3,009,645 | 11/1961 | Nugent | 239/179 |
| 3,047,236 | 7/1962 | Fahrner | 239/179 |
| 3,108,440 | 10/1963 | Anderson | 61/29 |
| 3,726,478 | 4/1973 | McMurray | 239/212 |
| 4,142,551 | 3/1979 | Wilms | 137/615 |
| 4,172,551 | 10/1979 | Johnson | 239/179 |
| 4,276,917 | 7/1981 | Fujita | 137/615 X |
| 4,384,676 | 5/1983 | Zimmerman | 239/179 |
| 4,844,133 | 7/1989 | von Meyerinck et al. | 137/615 X |
| 5,080,290 | 1/1992 | Ostrom | 239/724 |

FOREIGN PATENT DOCUMENTS

| | | | |
|---|---|---|---|
| 917802 | 4/1982 | U.S.S.R. | 239/724 |
| 976907 | 12/1982 | U.S.S.R. | 239/724 |

Primary Examiner—Andres Kashnikow
Assistant Examiner—Kevin P. Weldon
Attorney, Agent, or Firm—Zarley, McKee, Thomte, Voorhees & Sease

[57] ABSTRACT

A water inlet for a linear move irrigation system wherein the water inlet is supported upon a wheeled frame which travels along the bottom of an irrigation ditch adjacent one side thereof. The water inlet is fluidly connected to the end most support tower by a plurality of jointed pipes arranged such that the water inlet may be raised out of the irrigation ditch at times. The jointed connection of the pipes permits the water inlet to vertically move relative to the support tower to compensate for vertical differences in the irrigation ditch and the cart path upon which the support tower travels.

3 Claims, 7 Drawing Sheets

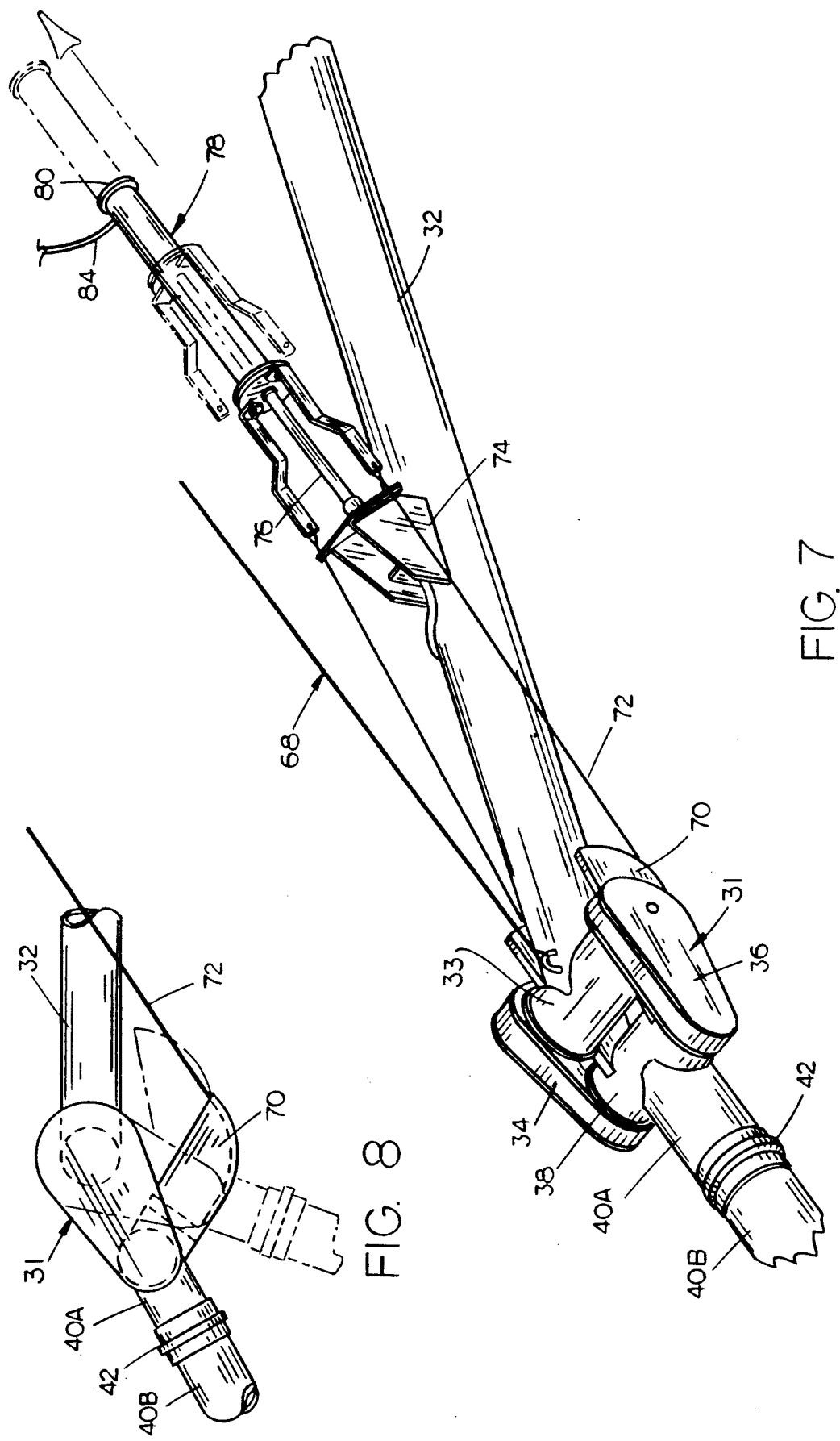

WATER INLET FOR A LINEAR MOVE IRRIGATION SYSTEM

BACKGROUND OF THE INVENTION

This invention relates to a linear move irrigation system and more particularly to a water inlet for a linear move irrigation system.

Linear move irrigation systems such as disclosed in U.S. Pat. No. 4,172,551, the disclosure of which is incorporated herein by reference thereto to complete this disclosure, generally comprise an elongated water conduit which extends over the field to be irrigated and which is supported by a series of support towers spaced along the length thereof. Each of the support towers is self-propelled so that the conduit may be moved across the field to be irrigated. The linear move irrigation system such as disclosed in the '551 patent normally obtains the water therefor from a canal or ditch which extends along one side of the field. Normally, a road or cart path is provided along the length of the ditch adjacent thereto with the endmost support tower traveling along the road or cart path. Normally, a water inlet pipe or hose is operatively connected to the support tower positioned on the road with one end of the water inlet pipe being positioned in the ditch so that water may be drawn into the system.

In the United States, the road adjacent the ditch is normally located at the same elevation as the top of the ditch or slightly below the top of the ditch so that very little vertical movement of the water inlet pipe is required to compensate for vertical elevational differences between the road and the ditch as the endmost support tower moves along the road. However, in some foreign countries, the vertical distance between the top of the ditch and the road may vary considerably such that the surface of the road may be 1.5 meters above the top of the ditch in some locations and may be located 1.5 meters below the top of the ditch in other locations. A further complicating fact is that there may very well be a second linear move irrigation system on the opposite side of the irrigation ditch which is also moving along the ditch so it is necessary that some means be provided to enable the respective systems to meet and pass one another, if necessary.

It is therefore a principal object of the invention to provide an improved water inlet for a linear move irrigation system.

A further object of the invention is to provide a linear move irrigation system having an inlet pipe means associated therewith including means for permitting the water inlet pipe to move vertically with respect to the support tower nearest the irrigation ditch to compensate for elevational differences between the ditch and the road surface upon which the endmost support tower is traveling.

Still another object of the invention is to provide a linear move irrigation system including a water inlet pipe having means associated therewith for raising the water inlet pipe out of the irrigation ditch at times to permit the water inlet pipe to be passed over a gate or the like located in the irrigation ditch.

Still another object of the invention is to provide a linear move irrigation system having a water inlet pipe means associated therewith including means for yieldably urging the water inlet pipe means towards one side of the irrigation ditch.

Still another object of the invention is to provide a linear move irrigation system having a wheeled water intake pipe means.

Yet another object of the invention is to provide a linear move irrigation system including a wheeled water inlet pipe and float means associated therewith which counteracts the weight of the water in the water inlet pipe so that the inlet pipe may be more easily urged towards the side of the irrigation ditch.

These and other objects of the present invention will be apparent to those skilled in the art.

BRIEF DESCRIPTION OF THE DRAWINGS

FIG. 7 is a perspective view illustrating the means by which the water inlet pipe is urged towards the side of a ditch nearest the support tower; and FIG. 8 is a side view of a portion of the structure of FIG. 7;

SUMMARY OF THE INVENTION

A water inlet pipe for a linear move irrigation system is described which has the ability to compensate for relative vertical elevational differences between an irrigation ditch extending along the length of the field to be irrigated and the roadway adjacent thereto upon which one of the support towers travels. A first pipe is operatively secured to the inlet side of a pump on the support tower and includes a portion which extends transversely outwardly from the support tower. A second pipe is pivotally secured about a horizontal axis parallel to the length of the ditch, to the first pipe by means of a pipe joint. A third pipe is pivotally secured about a horizontal axis parallel to the length of the ditch, to the outer end of the second pipe by means of a pipe joint. An inlet pipe portion is secured to the outer or lower end of the third pipe which travels along the bottom of the ditch adjacent one side thereof. The opposite ends of the inlet pipe portion have wheels mounted thereon to enable the inlet pipe portion to roll along the ditch. A winch is provided for raising the inlet pipe out of the irrigation ditch at times to enable the inlet pipe to pass over a gate or other obstruction within the ditch. Means is also provided for urging the inlet pipe portion towards the side of the ditch adjacent the support tower. An optional water pressurization means is also described which permits the roadway to be further above the ditch than could be accommodated by the cart pump alone.

DESCRIPTION OF THE PREFERRED EMBODIMENT

Figure 1:
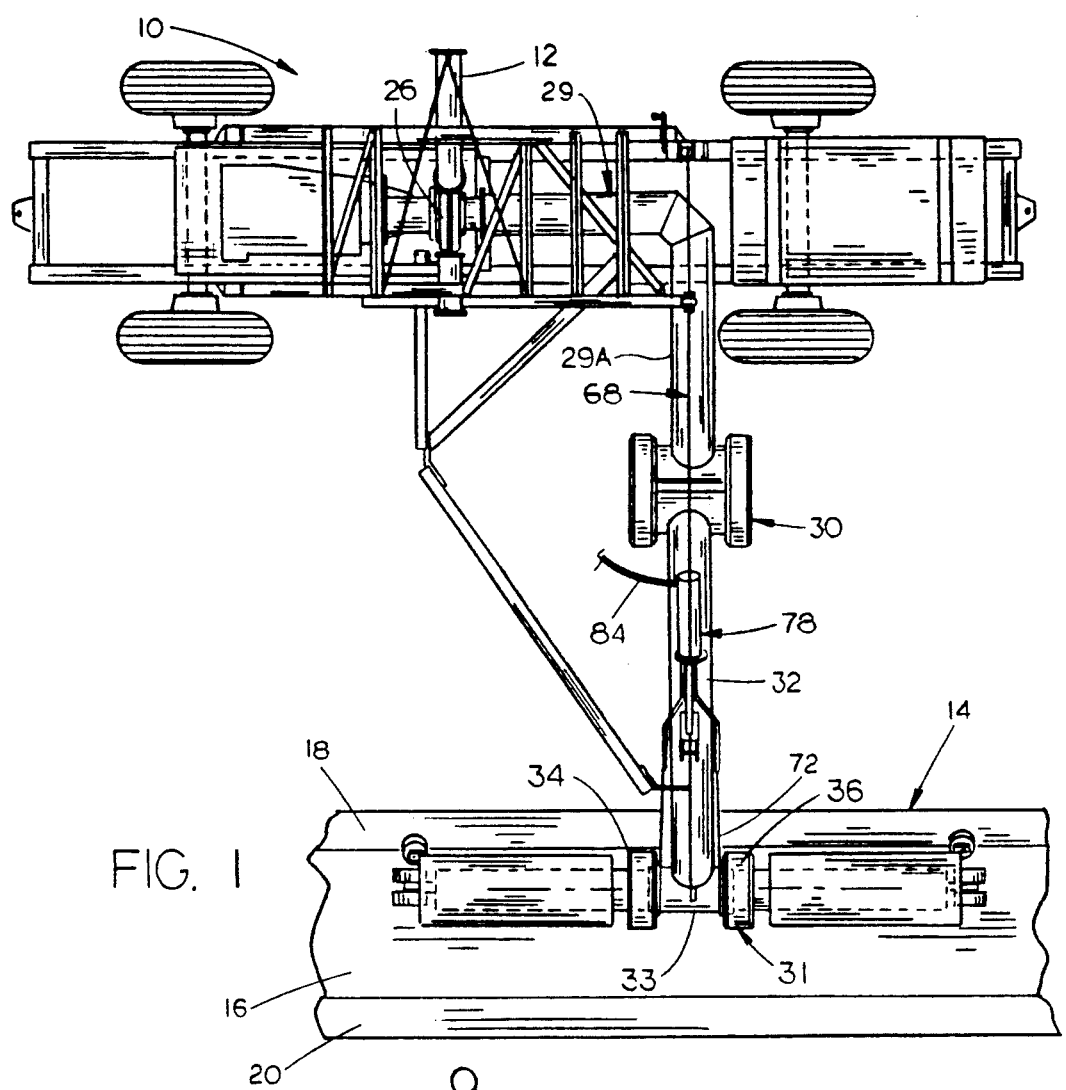
FIG. 1 is a top view of the water inlet pipe of this invention connected to a support tower of a linear move system.
Figure 2:
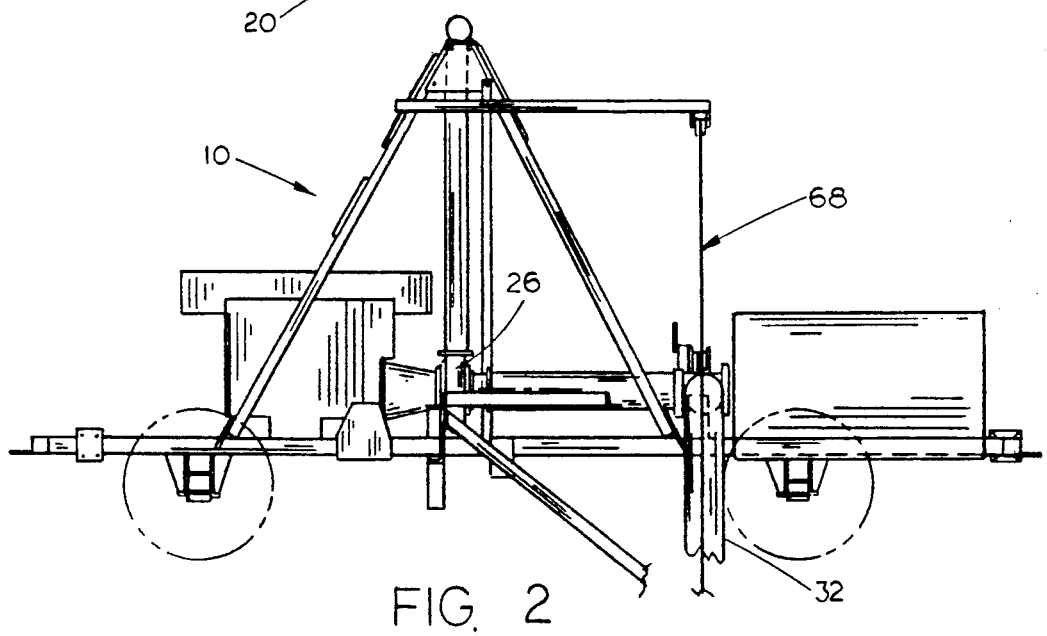
FIG. 2 is an end view of the apparatus of FIG. 1.

Referring to FIG. 1, the numeral 10 refers generally to an end support tower having a water conduit 12 extending therefrom which would be connected to the main water conduit extending over the field to be irrigated such as in U.S. Pat. No. 4,172,551. U.S. Pat. No. 4,172,551 is relied upon herein to complete the details of the linear move irrigation system. The main water conduit is supported by a plurality of self-propelled support towers in conventional fashion and would be propelled along the length of the field in conventional fashion. The instant invention relates to the means by which the water or other liquid is drawn from an irrigation canal or ditch 14 having a bottom 16 and opposite sides 18 and 20.

Figure 3:
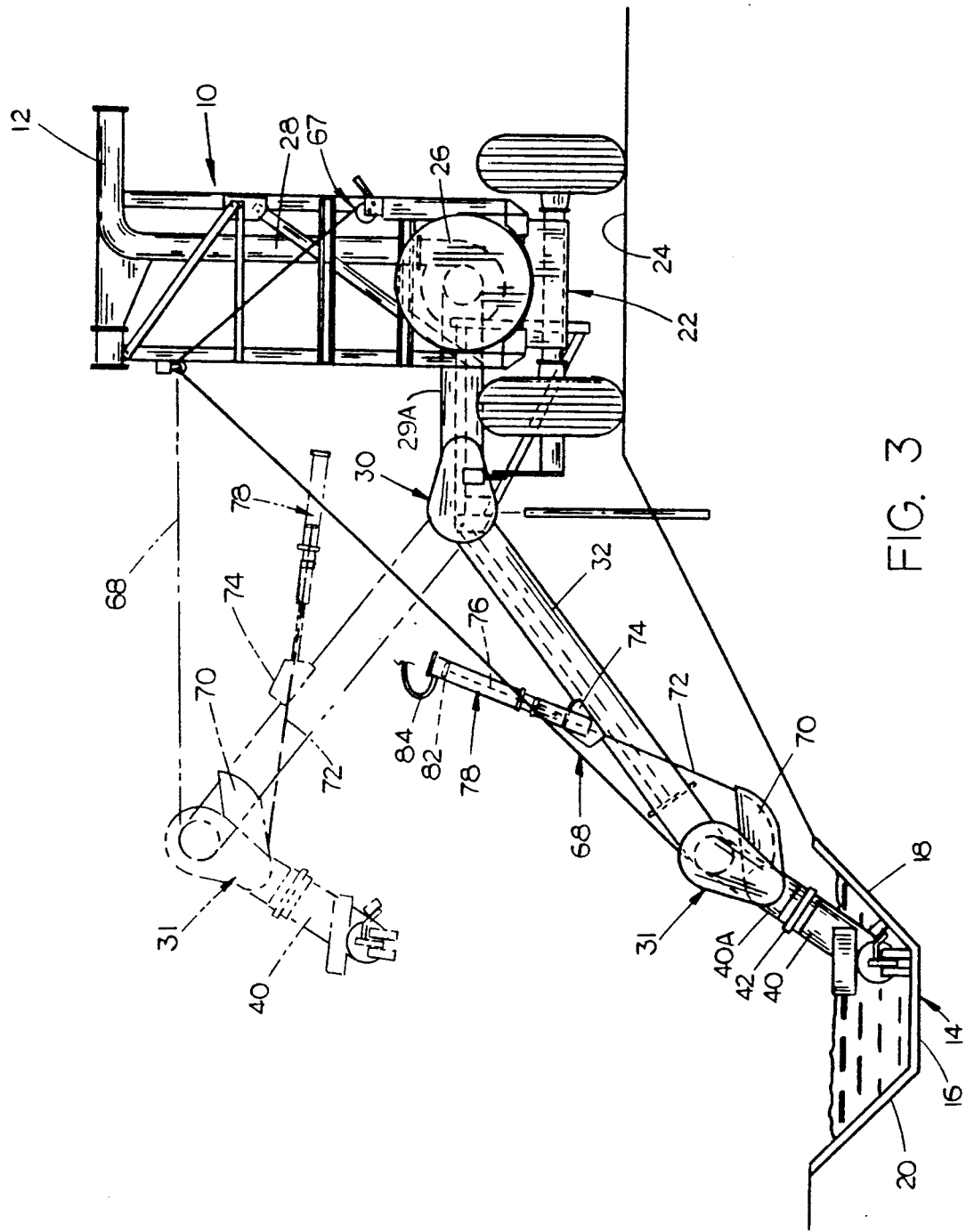
FIG. 3 is a side view of the apparatus with the phantom lines illustrating the water inlet pipe having been raised out of the irrigation ditch.
Figure 4:
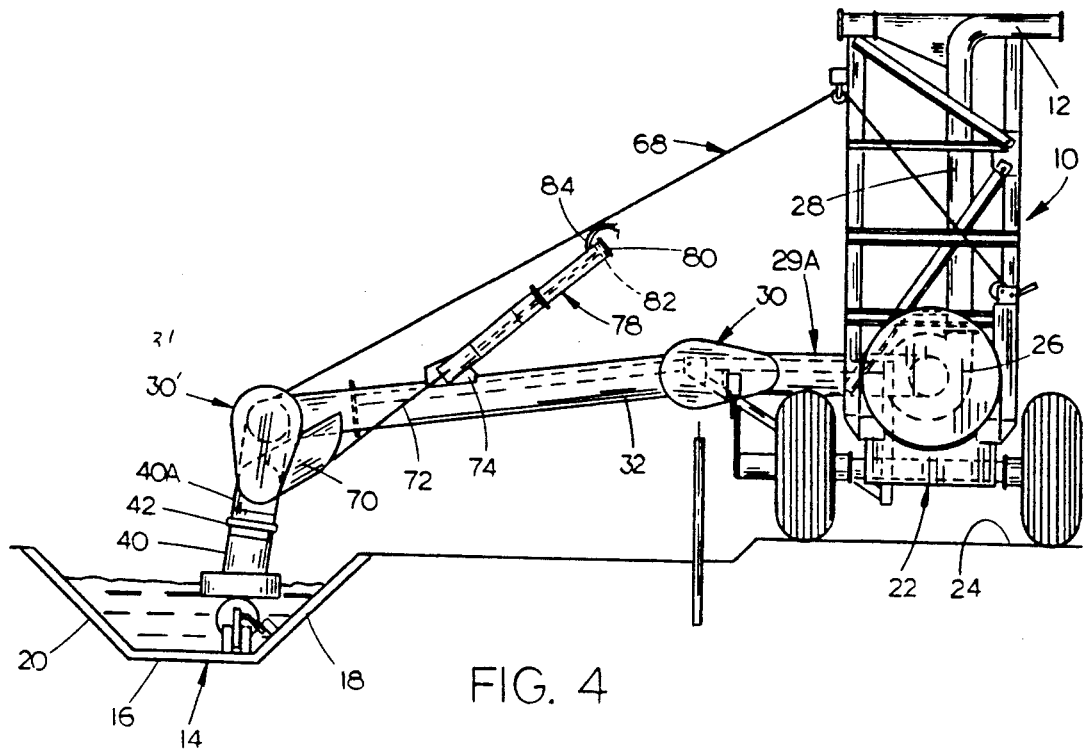
FIG. 4 is a view similar to FIG. 3 except that the relative vertical distance between the roadway and the top of the ditch is less than in FIG. 3.
Figure 5:
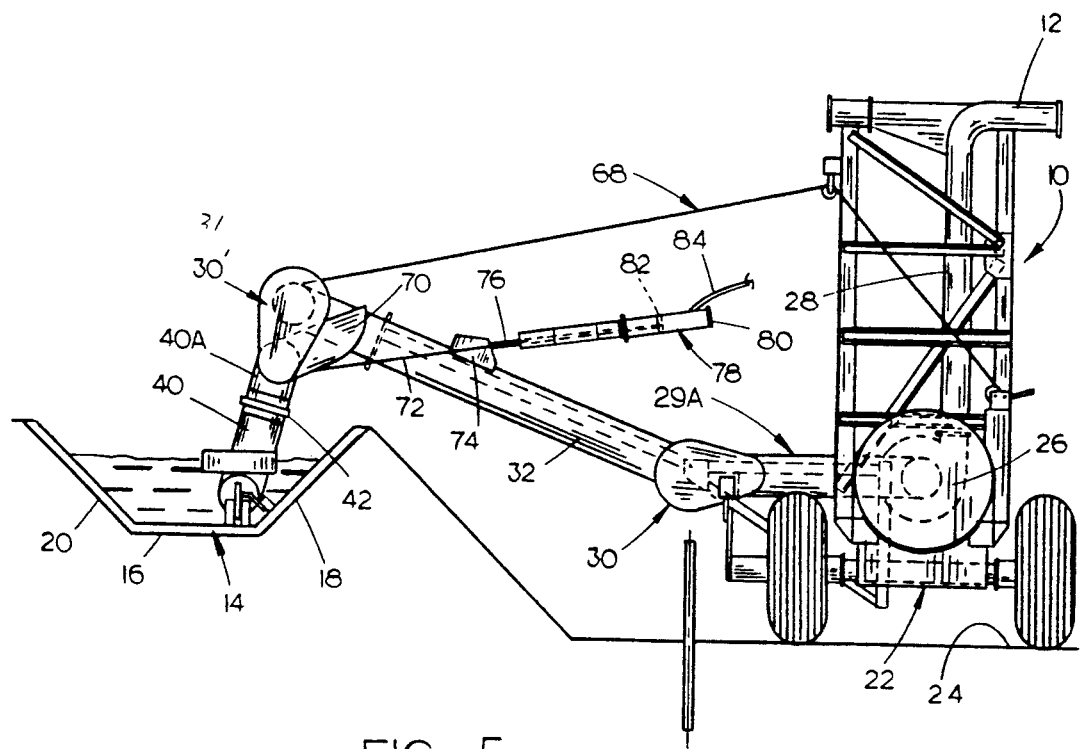
FIG. 5 is a view similar to FIGS. 3 and 4 except that the roadway is shown as being located at a level below that of the top of the irrigation ditch.

Referring to FIG. 3, support tower 10 includes a wheeled frame means 22 adapted to move along the roadway or cart path referred to generally by the reference numeral 24 and which is positioned laterally of the irrigation ditch 14. As seen in the drawings, in some cases the roadway 24 is located above the upper end or top of the ditch 14 (FIGS. 3 and 4) or may be located below the upper end or top of the irrigation ditch 14 as illustrated in FIG. 5. Support tower 10 is provided with a conventional water pump 26 which is operated by a conventional power means such as an electric motor or gasoline engine. Pipe stub 28 extends from the discharge side of pump 26 to the conduit 12.

Pipe 29 extends from the inlet side of the pump 26 and includes a transversely or laterally extending pipe portion 29A. A joint 30 interconnects pipe portion 29A and pipe 32.

Joint 31 is provided at the outer end of pipe 32 and is identical to joint 30. Since joint 30 is not shown in detail in the drawings, joint 31 will be so described. As seen in FIG. 7, joint 31 includes pipe portion 33 which is in fluid communication with the outer end of pipe 32 and which has water manifolds 34 and 36 connected to the outer ends thereof. The interior of pipe portion 33 is in fluid communication with the interiors of the fluid manifolds 34 and 36. The outer ends of the manifolds 34 and 36 have a pipe portion 38 operatively pivotally connected thereto about a horizontal axis parallel to the longitudinal axis of the irrigation ditch. Pipe 40A is in communication with the interior of pipe portion 38 and extends transversely therefrom as seen in the drawings.

Pipe 40B is connected to pipe 40A by a gimbal-ring joint 42 provided to permit the pipe portion 40A and 40B to pivot relative to one another about horizontal and vertical axes.

Figure 9:
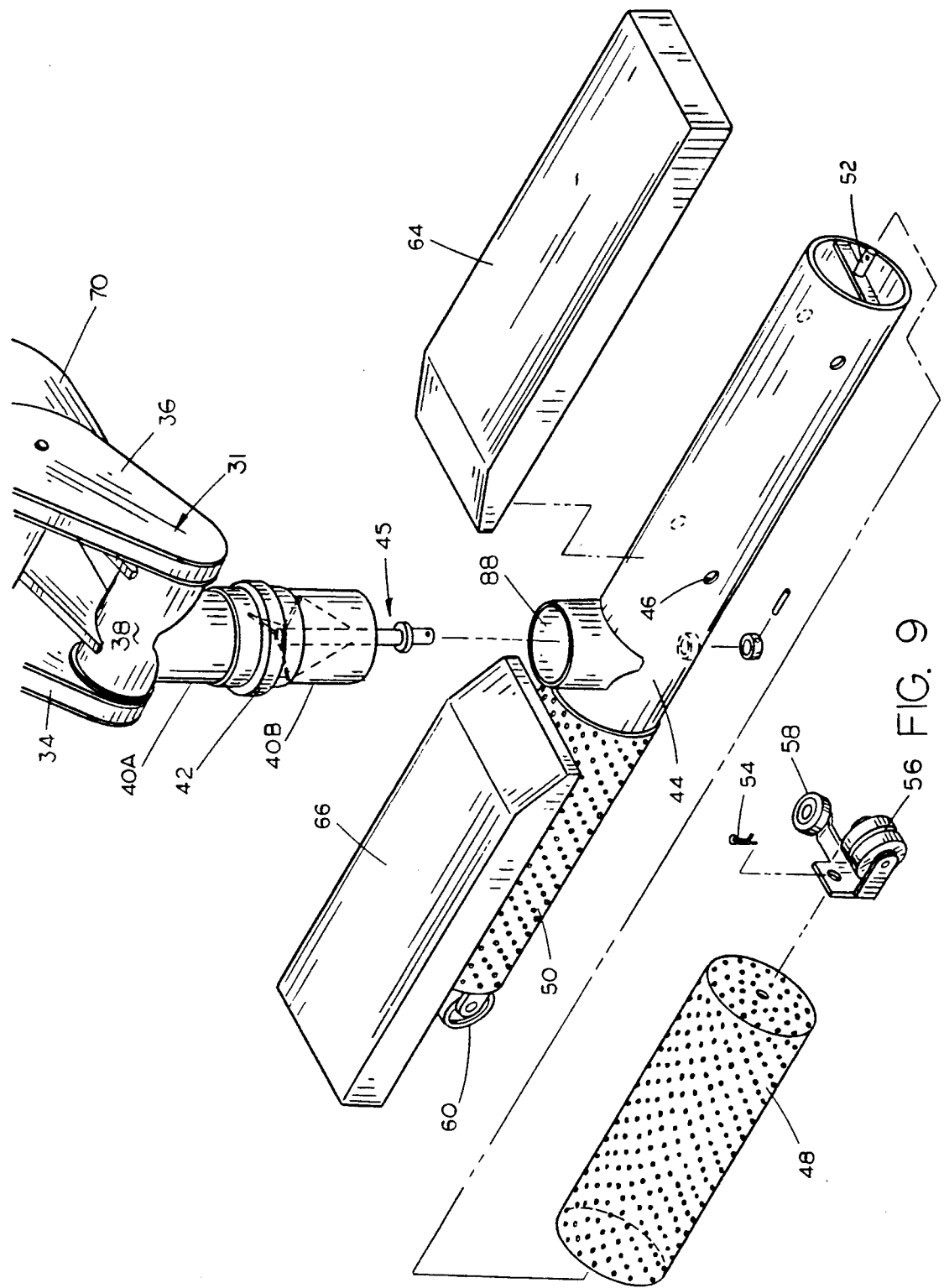
FIG. 9 is a partial exploded perspective view of the inlet pipe portion.

An elongated inlet pipe 44 is rotatably secured about a vertical axis, to the lower end of pipe portion 40B by joint 45. As seen in the drawings, pipe 44 is provided with a plurality of holes 46 formed therein. A pair of perforated screens 48 and 50 are positioned on opposite ends of the pipe 44 and are maintained thereon by means of a pin 52 and key 54 arrangement as illustrated in FIG. 9. A pair of wheels 56 and 58 are secured to one end of pipe 44 while a pair of wheels 60 and 62 (not shown) are secured to the other end of the pipe 44. Wheels 56 and 60 are adapted to roll upon the bottom of the ditch while wheels 58 and 62 are adapted to engage the side of the ditch as seen in FIG. 3. A pair of floats 64 and 66 are secured to the screens 48 and 50 to compensate for some of the weight in the inlet pipe so that the inlet pipe may be urged more easily towards the side of the ditch nearest the support tower. A winch assembly 67 which includes winch cable 68 is provided for raising and lowering the inlet pip out of the ditch at times so that the inlet pipe may be passed over an obstruction in the ditch such as an irrigation gate or the like as seen in FIG. 3.

Bracket 70 is secured to the lower half of joint 31 and has a cable 72 secured thereto which extends therefrom. Bracket 74 is mounted on pipe 32 and has the rod 76 of a water cylinder 78 rigidly secured thereto. Cable 72 is secured to the movable body portion 80 of the water cylinder 78. Water cylinder 78 has a piston 82 provided therein as seen in FIG. 4. Water under pressure is supplied to the interior of the water cylinder 78 at 84 so that the water pressure within water cylinder 78 will urge the cylinder body 80 away from bracket 74 or in other words, cause the rod 76 to be extended from the body 80. The water pressure within the water cylinder 78 causes the cable 72 to pull on the bracket 70 which causes the water inlet pipe to be urged towards the side of the ditch nearest the support tower so that there will be room for the inlet pipe of a linear system located on the opposite side of the ditch should the two pass. An air spring could be substituted for the water cylinder 78 if so desired.

Thus the inlet pipe means, through its various flex joint connections, may move vertically relative to the support tower 10 such as when the road surface 24 is located some distance above the upper end of the ditch as illustrated in FIG. 3 and to pivotally move to the position illustrated in FIG. 5 when the road surface 24 is located below the upper end of the irrigation ditch. The winch 67 provided on the apparatus also permits the inlet pipe means to be raised out of the canal at times as previously described.

Figure 6:
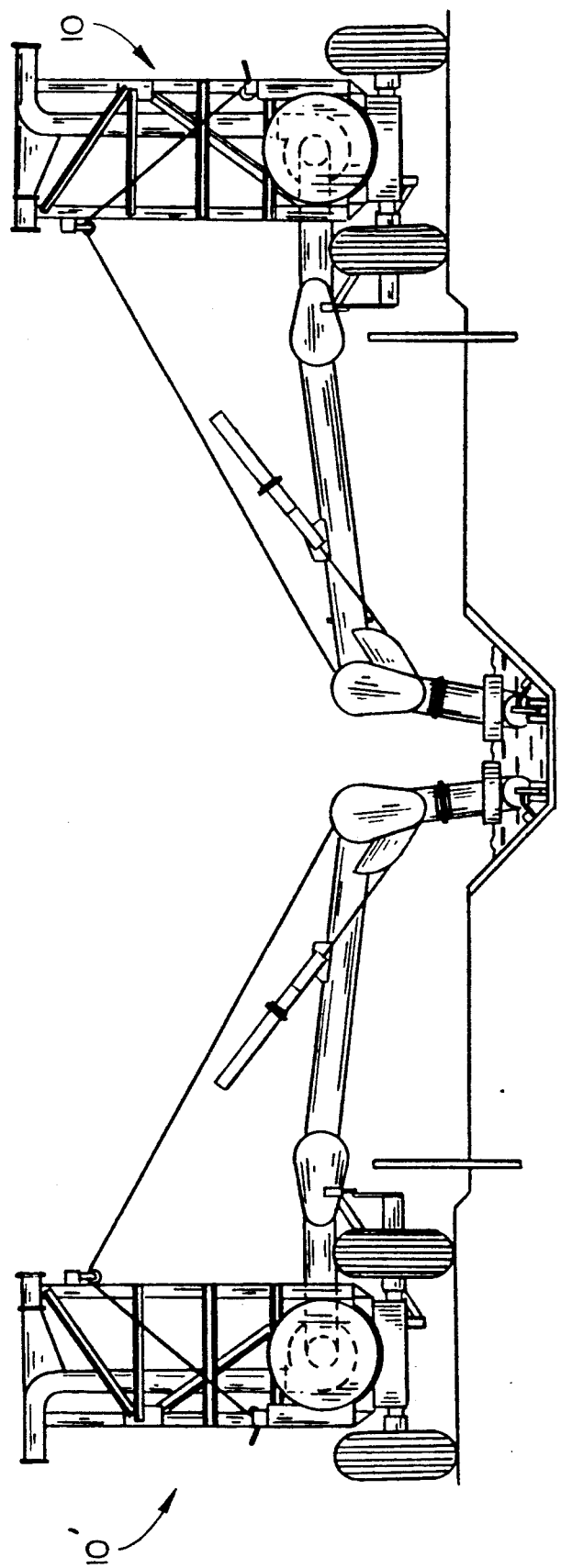
FIG. 6 is a side view illustrating a pair of linear irrigation systems taking water from the same irrigation ditch.

The provision of the water cylinder 78 ensures that the inlet pipe means will be positioned closely adjacent the side of a ditch closest to the support tower 10 as illustrated in the drawings to enable a pair of systems to pass one another as illustrated in FIG. 6. In FIG. 6, the second system is referred to by the reference number 10'. The floats 64 and 66 positioned on the inlet pipe compensate for the weight of the water in the inlet pipe so that the water cylinder 78 may more easily move the water inlet pipe adjacent the side 18 as illustrated in FIG. 3.

Figure 10:
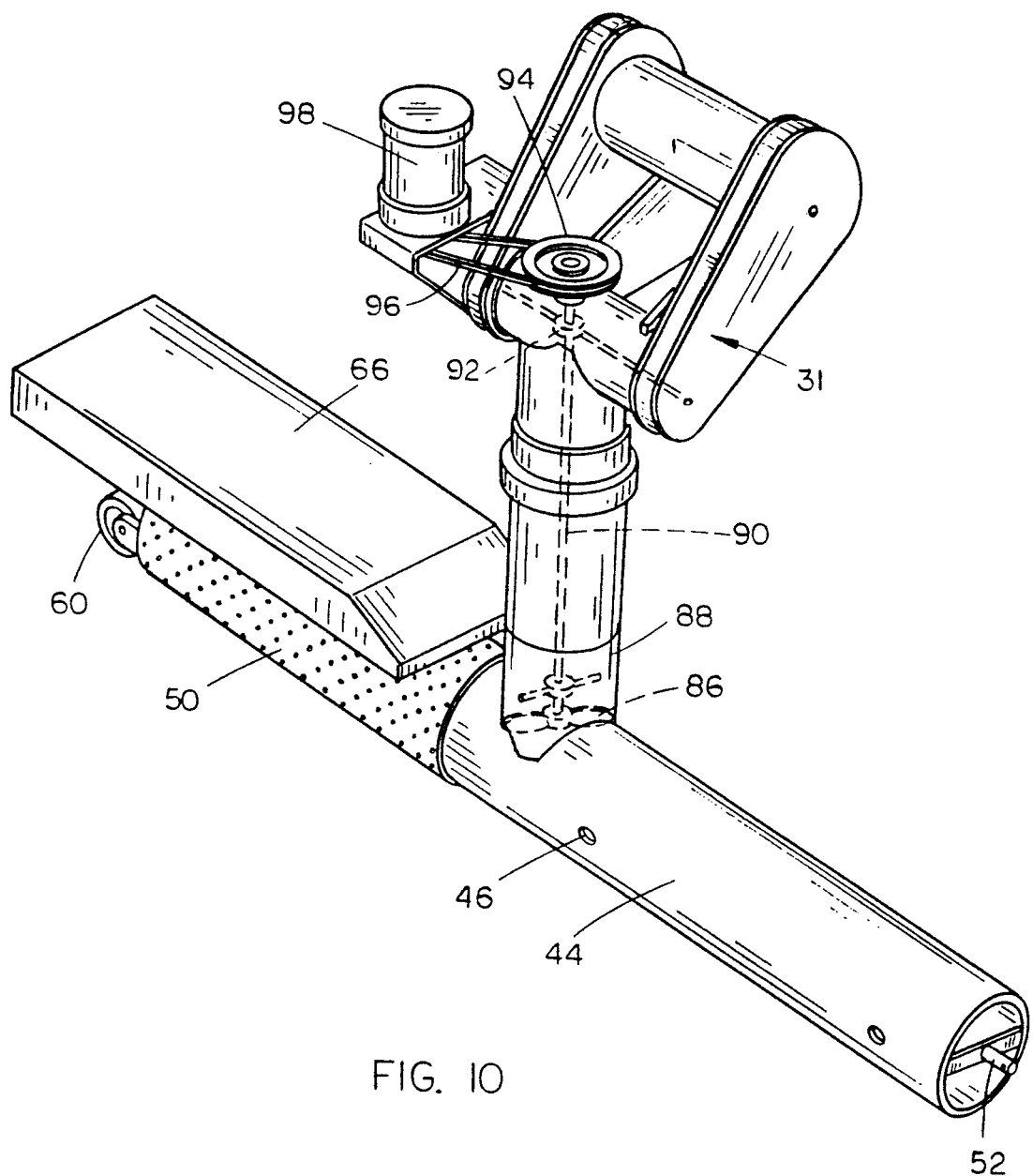
FIG. 10 is a partial perspective exploded view of an optional water pressurization method.

FIG. 10 illustrates an optional water pressurization method to allow the roadway 24 to be farther above the ditch 14 than could be accommodated by cart pump 26 alone. In FIG. 10, it can be seen that a water impeller 86 is positioned in the pipe stub 88 which is welded to lead pipe 44. Shaft 90 extends upwardly from impeller 86 through pipe 38. A bearing and seal 92 embraces shaft 90 where it exits out through pipe 38. Pulley 94 is mounted on the upper end of shaft 90 and has a V-belt 96 extending therearound. The numeral 98 refers to a motor preferably of the seven horsepower class in which it is adapted to drive the V-belt 96.

Thus, actuation of motor 98 causes the impeller 86 to rotate to assist in the pressurization of the water so that the roadway 24 may be farther above the ditch 14 than could be accommodated by the cart pump 26 alone. The embodiment of FIG. 10 is designed for an increased lift of the water in the ditch.

Thus it can be seen that the invention accomplishes at least all of its stated objectives.

I claim:

1. A linear move irrigation system for irrigating a field comprising,
   a conduit extending transversely from an elongated irrigation ditch extending lengthwise adjacent the field,
   said ditch including a bottom and opposite sides,
   said conduit supported above the ground by a series of support towers each having drive means associated therewith,
   a series of water dispensers located along the length of the conduit for dispensing water fed through the conduit to the field,
   the support tower nearest the irrigation ditch adapted to move along a road adjacent the irrigation ditch and having an inlet pipe means extending therefrom which is in fluid communication with the irrigation ditch,
   said inlet pipe means also being in fluid communication with the conduit whereby water in the irrigation ditch may be fed to the conduit,
   means supporting said inlet pipe means whereby said inlet pipe means may vertically move with respect to said nearest support tower to compensate for variations in the relative elevation between the road and the irrigation ditch,
   a pump means mounted on said nearest support tower which has inlet and outlet ends, the outlet end of said pump means being in fluid communication with said conduit,
   said inlet pipe means comprising a first pipe means operatively secured to the inlet end of said pump means and extending transversely outwardly from said nearest support tower towards the irrigation ditch,
   a first pivotal pipe joint means at the outer end of said first pipe means,
   a second pipe means connected to said first pivotal pipe joint means and extending outwardly therefrom,
   said first pivotal pipe joint means permitting said second pipe means to be pivoted about a horizontal axis parallel to the length of the irrigation ditch, relative to said first pipe means,
   a second pivotal pipe joint means secured to the outer end of said second pipe means,
   a third pipe means secured to said second pivotal pipe joint means and normally extending downwardly therefrom,
   said second pivotal pipe joint means permitting said third pipe means to be pivoted, about a horizontal axis parallel to the length of the irrigation ditch, relative to said second pipe means,
   a longitudinally extending inlet pipe portion normally positioned in the irrigation ditch canal,
   the lower end of said third pipe means being connected to said inlet pipe portion,
   means operatively interconnecting said second and third pipe means for urging said inlet pipe portion towards the side of the irrigation ditch adjacent the nearest support tower,
   interconnecting means comprising a first bracket means secured to said second pipe means,
   an elongated hydraulic cylinder means including a cylinder rod and a cylinder body, the outer end of said cylinder rod being secured to said first bracket means whereby extension of said cylinder rod from said cylinder body causes said cylinder body to move with respect to said first bracket means towards said nearest support tower,
   and an elongated cable means having one end operatively secured to said cylinder body and its other end operatively secured to said third pipe means whereby extension movement of said cylinder body with respect to said cylinder rod causes said inlet pipe portion to be urged towards the said side of the irrigation ditch.

2. The system of claim 1 includes means for retracting and extending said hydraulic cylinder.

3. The system of claim 2 wherein said hydraulic cylinder comprises a water cylinder.

* * * * *